July 19, 1960    H. NIEDEROEST    2,945,546
SAFETY BRAKE
Filed Feb. 16, 1959    2 Sheets-Sheet 1
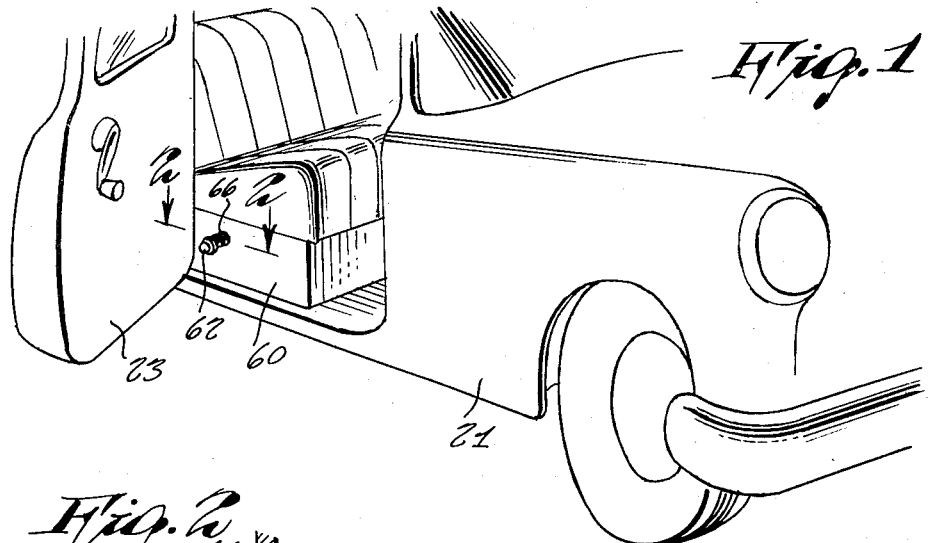
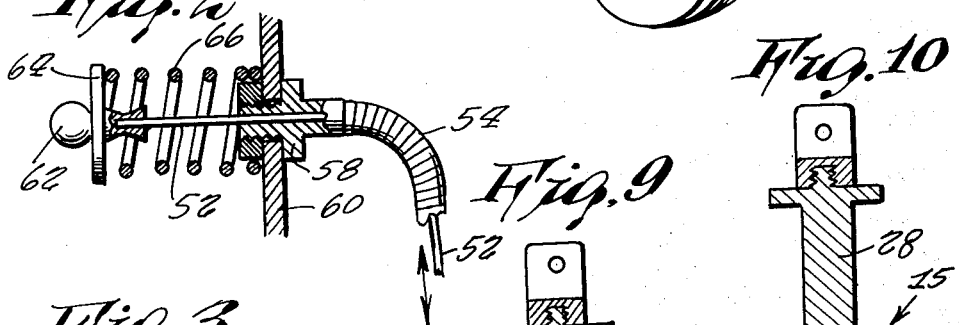
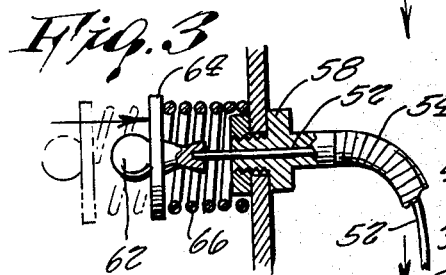
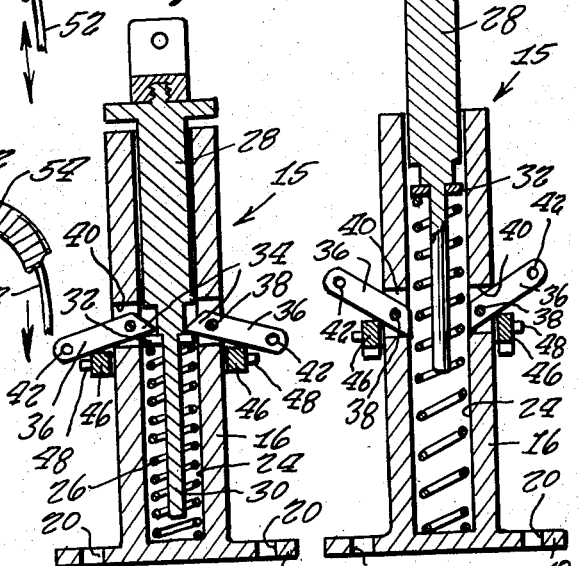
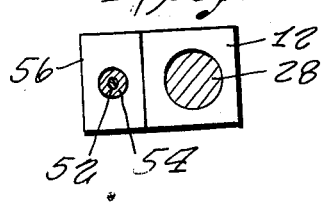
INVENTOR.
HENRY NIEDEROEST
BY
Carl Miller
ATTORNEY July 19, 1960 H. NIEDEROEST 2,945,546
SAFETY BRAKE
Filed Feb. 16, 1959 2 Sheets-Sheet 2
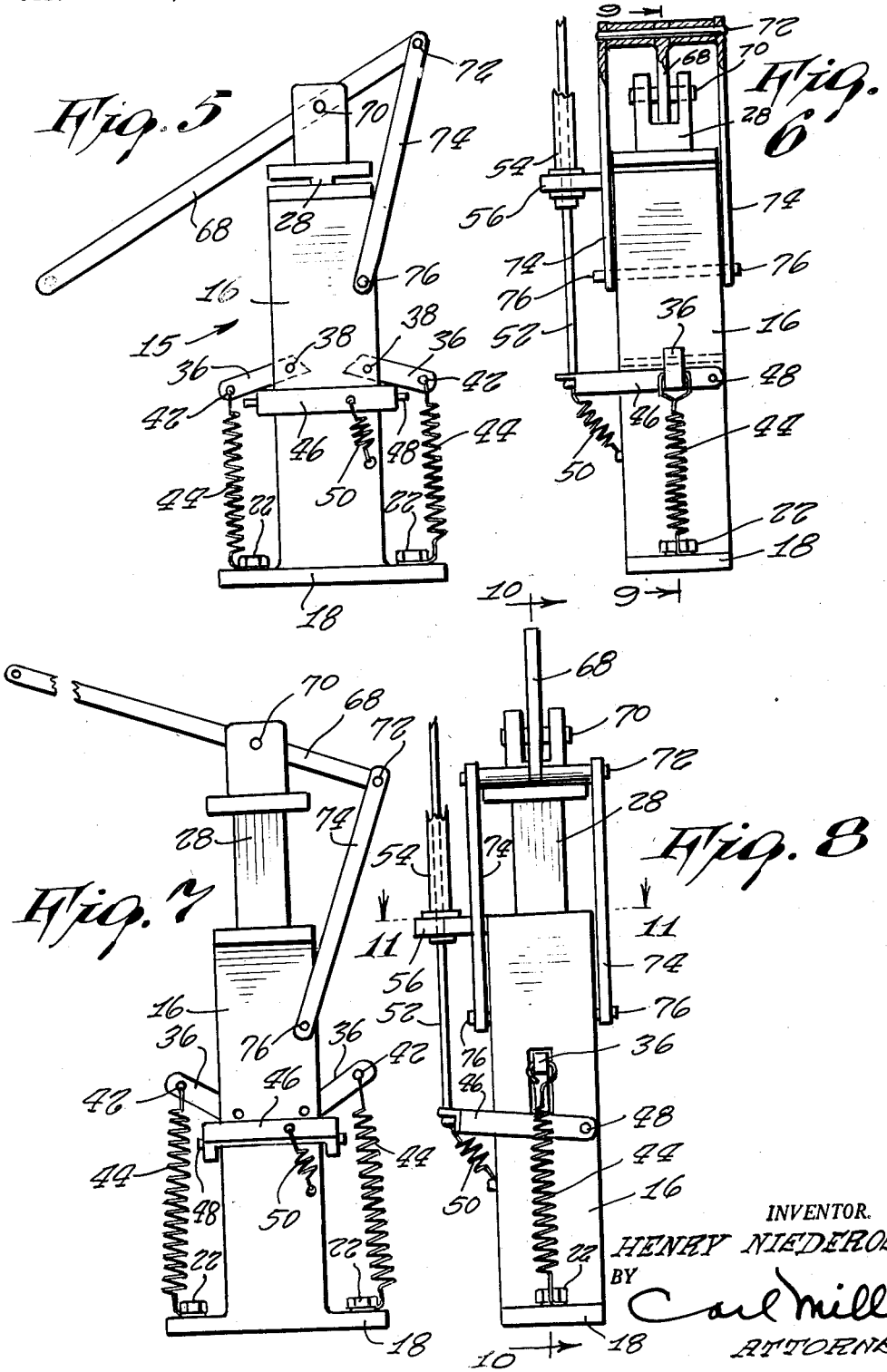

United States Patent Office 2,945,546
Patented July 19, 1960

1

2,945,546

SAFETY BRAKE

Henry Niederoest, 72 Hillside Ave., Metuchen, N.J.

Filed Feb. 16, 1959, Ser. No. 793,414

5 Claims. (Cl. 180—82)

This invention relates to automotive vehicles and, more particularly, to an improved safety brake therefor of the type disclosed in my earlier issued patent, No. 2,866,511, dated December 30, 1958.

Ordinarily, the opening of a vehicle door while the vehicle is in motion is quite dangerous as the driver or passenger can be thrown out of the vehicle and severely injured. Also, the hand brake of the vehicle should always be applied before the vehicle is left standing by the operator. In many instances, the door of the vehicle is accidentally opened while the vehicle is in motion, or the operator frequently forgets to securely apply the hand brake before leaving the vehicle. It is therefore an object of the present invention to provide an improved safety brake for automotive vehicles which is automatically actuated in response to the opening of the vehicle door while the vehicle is in motion or at a standstill, for the purpose of avoiding these hazards.

Another object of the present invention is to provide an automatically operated safety hand brake for all types of automotive vehicles that can be conveniently installed in new production models or applied to existing models in a simple and efficient manner.

Still an additional object of the present invention is to provide a safety brake for automotive vehicles of the type described that is not dependent upon an outside source of power, such as the vehicle battery or hydraulic system, so that the brake will be positively applied automatically in response to the slight opening of the vehicle door without any additional application of power thereto.

All of the foregoing and still further objects and advantages of this invention will become apparent from a study of the following specification, taken in connection with the accompanying drawing, wherein:

Figure 1 is a fragmentary perspective view of an automobile embodying a safety brake assembly made in accordance with the present invention;

Figure 2 is an enlarged fragmentary cross sectional view taken along line 2—2 of Figure 1 with a push button control portion in an extended position;

Figure 3 is a view similar to Figure 2, showing the push button in a depressed position;

Figure 4 is a perspective view of an abutment member forming a part of the assembly shown in Figures 2 and 3;

Figure 5 is a side elevational view of the main control unit forming a part of the present invention with the linkage thereof in a brake released position;

Figure 6 is a front elevational view, partly in section, of the assembly shown in Figure 5;

Figure 7 is a view similar to Figure 5, showing the linkage in a brake engaging position;

Figure 8 is a front elevational view of the assembly shown in Figure 7;

Figure 9 is a transverse cross sectional view taken along line 9—9 of Figure 6;

Figure 10 is a transverse cross sectional view taken along line 10—10 of Figure 8; and Figure 11 is a transverse cross sectional view taken along line 11—11 of Figure 8.

Referring now to the drawing, and more particularly to Figures 9 and 10 thereof, a control unit 15 forming a part of the present invention is shown to include a main housing 16 having a base flange 18 with openings 20 extending therethrough for receiving bolts 22 for attaching the unit to the fire wall of the automobile 21. The interior of the housing 16 includes a longitudinal bore 24 within which a compression coil spring 26 is supported in partly encircling relationship with a depending stem 30 of the main plunger 28. The lower end of the spring 26 is seated upon the base of the housing, while the opposite upper end thereof is seated upon an abutment plate 32 carried by the plunger 28 which also serves as a pair of detents for engagement by the inner ends 34 of a pair of levers 36 that are pivotally mounted within cutouts 40 of the main housing 16, such as by pivot pins 38. The outer ends of the levers 36 are provided with openings 42 for receiving one end of a pair of tension coil springs 44 that are secured at their opposite ends to the mounting bolts 22, as is more clearly shown in Figures 5 to 8 of the drawing.

The springs 44 normally maintain the innermost ends 34 of the levers 36 in abutting relationship with the plate 32 of the plunger 28, thus securing the plunger 28 in the retracted position shown in Figures 5 and 9, against the action of the compression coil spring 26. However, in response to upward pivotal movement of the outer ends of the levers 36, the inner ends 34 of the levers will disengage the plate 32, to release the plunger 28 for movement toward an extended position illustrated in Figures 8 and 10. The movement of the levers 36 in the released position is controlled by a U-shaped yoke 46 pivotally mounted upon the sides of the housing 16 by means of a pivot pin 48. The yoke 46 is normally urged toward a lowered inactive position by means of a tension coil spring 50, but may be actuated in an upward lever releasing position by means of a longitudinal pull upon a flexible cable 52 extending through a sheath 54 that is secured at one end to a bracket 56 on the housing 16. The opposite end of the flexible cable 52 extends through a fitting 58 integral with the opposite end of the sheath 54 and fastened to the seat frame 60, as is clearly shown in Figures 1 to 3 of the drawing. The outermost end of the cable 52 has a knob 62 and an abutment plate 64 with a radially extending mounting slot 65. A compression coil spring 66 acts between the seat frame 60 and the abutment plate 64 to normally urge the flexible cable 52 toward an outwardly extended position, illustrated in Figure 2, whenever the vehicle door 23 is in an open position. When the door 23 is in a closed position, the cable 52 is moved into the position shown in Figure 3 of the drawing, in which position the yoke 46 is permitted to return to the depressed position by the action of the spring 50, and the inner ends 34 of the levers 36 are extended into abutment with the plate 32 of the main plunger 38, thus retaining the plunger 28 in the retracted position illustrated in Figure 9.

Linkage is provided for connecting the control unit of the hand brake system of the vehicle. This linkage includes a main lever 68 pivotally mounted upon a pin 70 at the outer end of the plunger 28 and having a pivot pin 72 at one extremity hingedly connecting the adjacent end of a pair of guide levers 74 thereto, which guide levers are connected at their opposite ends by means of a pivot pin 76 to the side of the housing 16.

The operation of this device will now be readily understood. With the doors of the vehicle in a closed position, the cable 52 will permit the inner ends 34 of the levers 36 to project into the housing 16 for engagement with the plate 32 as soon as the operator moves the hand brake to the released position, which movement actuates the linkage 68 to depress the plunger 28 into the position shown in Figures 5, 6, and 9. However, as soon as the door 23 is opened, the outward movement of the cable 52 by the action of the spring 66 will raise the yoke 46 to cause the inner ends 34 of the levers 36 to disengage the plate 32, thus permitting the main plunger 28 to be ejected outwardly by the action of the compression coil spring 26. The outward movement of the plunger 28 actuates the linkage so as to move the main lever 68 into the position shown in Figures 7 and 8, thus engaging the hand brake of the vehicle and bringing it to a stop or automatically securing it in a parked position. Thus, so long as the door of the vehicle is opened, the hand brake is retained in the engaged position and may be disengaged only upon the closing of the door and subsequent movement of the hand brake to the released position.

It will be recognized that a push button assembly may be applied to each door section of the vehicle so as to automatically actuate the main control unit 15 whenever any one of these doors is opened.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A door control safety brake for automobiles comprising, in combination, a main housing having means for attachment to a vehicle fire wall, a plunger slidably supported within said main housing for reciprocating longitudinal movement between a normally retracted and an adjusted extended position, linkage connecting one outer end of said plunger to the hand brake of the automobile, said plunger in said retracted position permitting movement of said linkage to a hand brake released position, said plunger in said extended position adjusting the position of said linkage to effect engagement of said hand brake to an applied position, spring means acting upon said plunger to effect movement thereof to said extended position, detent means carried by said housing releasably securing said plunger in said retracted position against the action of said spring means, a push button supported upon a part of the automobile in the path of movement of a door, and flexible cable means connected between said push button and said detent means to retain said detent means in securing engagement with said plunger while the door is in a closed position, and pressure means acting against said push button and flexible cable means to release said detent means from engagement with said plunger and permit movement of said plunger to said extended position for actuating said hand brake in response to the opening of the door, said spring means comprising a compression coil spring supported within said main housing seated at one end against the bottom of said main housing and seated at its opposite end against said plunger, said compression coil spring urging said plunger toward an outwardly extended position, said detent means comprising a pair of levers pivotally mounted upon said housing for movement between a first position and a second position, said levers in said first position having inner ends extending to the interior of said housing into blocking engagement with said plunger, and said levers in said second position retracting said inner ends out of blocking engagement with said plunger to permit outward movement thereof by said compression coil spring.

2. A door control safety brake for automobiles comprising, in combination, a main housing having means for attachment to a vehicle fire wall, a plunger slidably supported within said main housing for reciprocating longitudinal movement between a normally retracted and an adjusted extended position, linkage connecting one outer end of said plunger to the hand brake of the automobile, said plunger in said retracted position permitting movement of said linkage to a hand brake released position, said plunger in said extended position adjusting the position of said linkage to effect engagement of said hand brake to an applied position, spring means acting upon said plunger to effect movement thereof to said extended position, detent means carried by said housing releasably securing said plunger in said retracted position against the action of said spring means, a push button supported upon a part of the automobile in the path of movement of a door, and flexible cable means connected between said push button and said detent means to retain said detent means in securing engagement with said plunger while the door is in a closed position, and pressure means acting against said push button and flexible cable means to release said detent means from engagement with said plunger and permit movement of said plunger to said extended position for actuating said hand brake in response to the opening of the door, said spring means comprising a compression coil spring supported within said main housing seated at one end against the bottom of said main housing and seated at its opposite end against said plunger, said compression coil spring urging said plunger toward an outwardly extended position, said detent means comprising a pair of levers pivotally mounted upon said housing for movement between a first position and a second position, said levers in said first position having inner ends extending to the interior of said housing into blocking engagement with said plunger, and said levers in said second position retracting said inner ends out of blocking engagement with said plunger to permit outward movement thereof by said compression coil spring, and a yoke pivotally mounted upon said housing for movement by said flexible cable means between a first position and a second position, and movement of said yoke from said first position to said second position effecting movement of said levers between said first position and said second position.

3. A door control safety brake for automobiles as set forth in claim 2, wherein said push button comprises a knob slidably supported upon a vehicle seat frame for movement between a first retracted and a second extended position, and movement of said knob from said first position to said second position in response to the opening of the vehicle door effecting movement of said yoke to said second position to effect movement of said levers to said second position to release said plunger for outward movement.

4. A door control safety brake for automobiles as set forth in claim 3, wherein said flexible cable comprises an axial force transmitting member connected at opposite ends to said knob and said yoke.

5. A door control safety brake for automobiles as set forth in claim 4, wherein said pressure means comprises a compression coil spring encircling said flexible cable adjacent to said knob and acting between said knob and said vehicle seat frame normally urging said knob toward said extended position.

References Cited in the file of this patent
UNITED STATES PATENTS

| | | |
|---|---|---|
| 1,993,645 | Birkigt | Mar. 5, 1935 |
| 2,720,293 | Brinkmeyer | Oct. 11, 1955 |
| 2,866,511 | Niederoest | Dec. 30, 1958 |